(12) United States Patent
Jiang et al.

(10) Patent No.: US 11,950,289 B2
(45) Date of Patent: Apr. 2, 2024

(54) METHOD AND DEVICE USED IN NODE FOR WIRELESS COMMUNICATION

(71) Applicants: Qi Jiang, Shanghai (CN); Xiaobo Zhang, Shanghai (CN); Lin Yang, Shanghai (CN)

(72) Inventors: Qi Jiang, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 440 days.

(21) Appl. No.: 17/220,941

(22) Filed: Apr. 2, 2021

(65) Prior Publication Data

US 2021/0227589 A1 Jul. 22, 2021

Related U.S. Application Data

(63) Continuation of application No. PCT/CN2019/122713, filed on Dec. 3, 2019.

(30) Foreign Application Priority Data

Dec. 26, 2018 (CN) .......................... 201811599567.X

(51) Int. Cl.
*H04W 74/08* (2009.01)
*H04W 72/21* (2023.01)
*H04W 74/0833* (2024.01)

(52) U.S. Cl.
CPC ....... *H04W 74/0833* (2013.01); *H04W 72/21* (2023.01)

(58) Field of Classification Search
CPC .............. H04W 74/0833; H04W 72/21; H04L 5/0005; H04L 27/2601; H04L 5/0091;
(Continued)

(56) References Cited

U.S. PATENT DOCUMENTS

| 2012/0002606 A1 | 1/2012 | Vujcic |
| 2014/0233492 A1 | 8/2014 | Nakashima |
(Continued)

FOREIGN PATENT DOCUMENTS

| CN | 104981022 A | 10/2015 |
| CN | 107547177 A | 1/2018 |
(Continued)

OTHER PUBLICATIONS

Yang et al., "Random Access Procedure for the Operation in Unlicensed Band", U.S. Appl. No. 62/716,952, filed Aug. 9, 2018, Total pp. 126 (Year: 2018).*
(Continued)

*Primary Examiner* — Shah M Rahman

(57) ABSTRACT

The disclosure provides a method and a device used in a node for wireless communication. A first node first transmits a first sequence and a first radio signal, at least one of the first sequence or the first radio signal carrying a target identifier, then monitors a first type of information in a first time window, and finally transmits a second sequence and a second radio signal when no feedback is detected for the first sequence and the first radio signal in the first time window; wherein at least one of the second sequence or the second radio signal carries the target identifier. Through the above design, the disclosure realizes re-transmissions of a preamble and information included in a Message A in 2-step random access scenarios, thereby improving the spectrum efficiency and improving the performance of transmission of the Message A in 2-step random access scenarios.

18 Claims, 6 Drawing Sheets

(58) Field of Classification Search
CPC ... H04L 1/0003; H04L 1/0009; H04L 1/1867; H04L 1/1812
See application file for complete search history.

(56) References Cited

U.S. PATENT DOCUMENTS

| | | | | |
|---|---|---|---|---|
| 2018/0124822 | A1 | 5/2018 | Wang et al. | |
| 2018/0242367 | A1* | 8/2018 | Kim | H04W 72/23 |
| 2018/0279186 | A1* | 9/2018 | Park | H04W 36/30 |
| 2018/0279376 | A1 | 9/2018 | Dinan | |
| 2019/0320467 | A1* | 10/2019 | Freda | H04L 5/0055 |
| 2019/0357266 | A1* | 11/2019 | Ren | H04W 80/02 |
| 2020/0068619 | A1* | 2/2020 | Kim | H04W 74/004 |
| 2020/0107369 | A1* | 4/2020 | Jeon | H04W 74/006 |
| 2020/0221503 | A1* | 7/2020 | Kusashima | H04W 74/0833 |
| 2021/0127324 | A1* | 4/2021 | Agiwal | H04W 48/14 |
| 2021/0144656 | A1* | 5/2021 | Wu | H04W 52/362 |
| 2021/0144777 | A1* | 5/2021 | Tang | H04W 74/008 |
| 2021/0153259 | A1* | 5/2021 | Wu | H04L 1/1864 |
| 2021/0219349 | A1* | 7/2021 | Huang | H04W 74/0833 |
| 2021/0321413 | A1* | 10/2021 | Shin | H04W 72/23 |
| 2021/0329703 | A1* | 10/2021 | Yang | H04L 5/001 |
| 2022/0408372 | A1* | 12/2022 | Feuersaenger | H04L 5/0064 |

FOREIGN PATENT DOCUMENTS

| | | | |
|---|---|---|---|
| CN | 108282276 A | 7/2018 | |
| CN | 108282897 A | 7/2018 | |
| CN | 108631928 A | 10/2018 | |
| CN | 110769494 A * | 2/2020 | ............ H04W 52/48 |
| WO | 2018175809 A1 | 9/2018 | |
| WO | 2020134909 A1 | 7/2020 | |

OTHER PUBLICATIONS

First Office Action received in application No. CN201811599567.X dated Jul. 20,2021.
First Search Report received in application No. CN201811599567.X dated Jul. 08,2021.
"Further consideration on 2-step RACH"MediaTck Inc, 3GPP TSG-RAN WG2 Meeting #103bis R2-1813965, sections 2.3and 2.4 of the text, Sep. 27, 2018.
CN201811599567.X Notification to Grant Patent Right for Invention dated Feb. 23, 2022.
CN201811599567.X Second Office Action dated Jan. 4, 2022.
Mediatek Inc. "R2-1816685,2 step RACH msgA and msgB contents"3GPP TSG-RAN WG2 Meeting#104, Nov. 16, 2018.
Huawei et al."R2-1816604, timers and counters for two-steps RACH"3GPP TSG-RAN WG2 Meeting#104, Nov. 16, 2018.
ISR received in application No. PCT/CN2017/098454 dated Mar. 4, 2020.

* cited by examiner

METHOD AND DEVICE USED IN NODE FOR WIRELESS COMMUNICATION

CROSS REFERENCE TO RELATED APPLICATIONS

This application is a continuation of International Application No. PCT/CN2019/122713, filed Dec. 3, 2019, claims the priority benefit of Chinese Patent Application No. 201811599567.X, filed on Dec. 26, 2018, the full disclosure of which is incorporated herein by reference

BACKGROUND

Technical Field

The disclosure relates to transmission methods and devices in wireless communication systems, and in particular to a communication method and device for random access in wireless communication.

Related Art

Application scenarios of future wireless communication systems are becoming increasingly diversified, and different application scenarios have different performance requirements on systems. In order to meet different performance requirements of various application scenarios, the 3rd Generation Partner Project (3GPP) Radio Access Network (RAN) #82 plenary session decided to standardize the Work Item (WI) phase of New Radio (NR) 2-step Random Access Channel (RACH).

Compared with conventional 4-step RACH, 2-step RACH implements the access of UEs more quickly and is beneficial for the transmission of small packets. In 2-step RACH, a Message A (MsgA) includes a preamble and data.

SUMMARY

In conventional 4-step RACH, a UE transmits only a preamble in a Msg1, and waits for a feedback Message 2 (Msg2) transmitted by a base station for the Msg1 in a Random Access Response (RAR) time window corresponding to the preamble; then, the UE transmits a Msg3 to the base station according to the Msg2 to determine a unique identifier of the UE so as to solve collision. In 2-step RACH, the MsgA will partially carry some functions of the Msg1 and Msg3 in 4-step RACH. However, in 4-step RACH, there is no HARQ (Hybrid Automatic Repeat request) in the Msg1, while there is a HARQ in the Msg3 to support retransmission. In 2-step RACH, when the Msg1 carries functions of both the Msg1 and Msg3 in conventional systems, how to retransmit the Msg1 needs to be considered.

In view of the above problems, a simple solution is that: each transmission of MsgA is considered as an initial transmission, that is, the base station does not combine multiple MsgAs to obtain a combination gain. However, this method will obviously reduce the performance of the data part in the MsgA. In view of the above problems, the disclosure provides a solution to support unicast and groupcast transmission. It should be noted that the embodiments of the first node of the disclosure and the characteristics in the embodiments may be applied to the base station if no conflict is incurred, and vice versa. Meanwhile, the embodiments of the second node of the disclosure and the characteristics in the embodiments may be applied to the terminal equipment. The embodiments of the disclosure and the characteristics in the embodiments may be mutually combined arbitrarily if no conflict is incurred.

The disclosure provides a method in a first node for wireless communication, wherein the method includes:
transmitting a first sequence and a first radio signal, at least one of the first sequence or the first radio signal carrying a target identifier;
monitoring a first type of information in a first time window; and
when the first type of information is not detected in the first time window, transmitting a second sequence and a second radio signal.

Herein, a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed Modulation and Coding Scheme (MCS) or an employed Redundancy Version (RV).

The disclosure provides a method in a first node for wireless communication, wherein the method includes:
transmitting a first sequence and a first radio signal, at least one of the first sequence or the first radio signal carrying a target identifier;
monitoring a first type of information in a first time window; and
detecting the first type of information in the first time window, the first type of information only including an identifier other than the target identifier, transmitting a second sequence and a second radio signal.

Herein, a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV.

In one embodiment, the above method has the following benefits: the first sequence and the first radio signal constitute a MsgA, the second sequence and the second radio signal are a retransmission of the MsgA; through the second information, the first node can indicate the second node in the disclosure to combine the first radio signal and the second radio signal to obtain a combination gain, thereby improving the performance of reception of the data part in the MsgA.

According to one aspect of the disclosure, the above method includes:
receiving a first signaling.

Herein, the first signaling is used for determining K1 candidate sequence(s), and the K1 is a positive integer; the first sequence is one of the K1 candidate sequence(s), and the second sequence is one of the K1 candidate sequence(s); the first node autonomously selects the first sequence from the K1 candidate sequence(s), and the first node autonomously selects the second sequence from the K1 candidate sequence(s).

In one embodiment, the above method has the following benefits: the second node in the disclosure preconfigures the K1 candidate sequence(s), so as to reduce the complexity of the second node detecting the first sequence and the second sequence.

According to one aspect of the disclosure, the above method is characterized in that: the first sequence is transmitted employing a first power value, the second sequence is transmitted employing a second power value, and the second power value is greater than the first power value; a difference between the second power value and the first power value is fixed, or a difference between the second power value and the first power value is configured through a higher layer signaling.

In one embodiment, the above method has the following benefits: the transmission of the preamble employs power ramping, thereby guaranteeing the orthogonality of the preamble and improving the performance of transmission.

According to one aspect of the disclosure, the above method is characterized in that: the first radio signal and the second radio signal employ a same transmit power.

In one embodiment, the above method has the following benefits: the performance of transmission of the data part in the MsgA is improved through a mode of combination gain, and interferences that are caused to other users by an unnecessary increase of power are avoided.

According to one aspect of the disclosure, the above method is characterized in that: the first radio signal and the second radio signal occupy a same number of Resource Elements (REs).

In one embodiment, the above method has the following benefits: the introduction of the second information does not increase the occupation of additional time-frequency resources, and the spectrum efficiency is improved.

According to one aspect of the disclosure, the above method is characterized in that: the second sequence is used for determining that the second radio signal is a second transmission of the first radio signal; or the second radio signal includes a target reference signal, and the target reference signal is used for determining that the second radio signal is a second transmission of the first radio signal.

According to one aspect of the disclosure, the above method has the following benefits: when the transmissions of the second radio signal and the first radio signal meet certain rules, and the certain rules need no explicit signaling to be indicated, for example, when the second radio signal includes only partial bits of the first bit block and there exists a third radio signal which is a third retransmission of the first radio signal, the above method enables the second node to adopt a proper combination method and a proper decoding method to receive multiple retransmissions of one MsgA.

The disclosure provides a method in a second node for wireless communication, wherein the method includes:

monitoring a first sequence and a first radio signal, at least one of the first sequence or the first radio signal carrying a target identifier;

transmitting a first type of information in a first time window, the first type of information only including an identifier other than the target identifier; and monitoring a second sequence and a second radio signal.

Herein, a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV.

The disclosure provides a method in a second node for wireless communication, wherein the method includes:

monitoring a first sequence and a first radio signal, at least one of the first sequence or the first radio signal carrying a target identifier;

giving up transmitting a first type of information in a first time window; and monitoring a second sequence and a second radio signal.

Herein, a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV.

According to one aspect of the disclosure, the above method includes:

transmitting a first signaling.

Herein, the first signaling is used for determining K1 candidate sequence(s), and the K1 is a positive integer; the first sequence is one of the K1 candidate sequence(s), and the second sequence is one of the K1 candidate sequence(s); the first node autonomously selects the first sequence from the K1 candidate sequence(s), and the first node autonomously selects the second sequence from the K1 candidate sequence(s).

According to one aspect of the disclosure, the above method is characterized in that: the first sequence is transmitted employing a first power value, the second sequence is transmitted employing a second power value, and the second power value is greater than the first power value; a difference between the second power value and the first power value is fixed, or a difference between the second power value and the first power value is configured through a higher layer signaling.

According to one aspect of the disclosure, the above method is characterized in that: the first radio signal and the second radio signal employ a same transmit power.

According to one aspect of the disclosure, the above method is characterized in that: the first radio signal and the second radio signal occupy a same number of REs.

According to one aspect of the disclosure, the above method is characterized in that: the second sequence is used for determining that the second radio signal is a second transmission of the first radio signal; or the second radio signal includes a target reference signal, and the target reference signal is used for determining that the second radio signal is a second transmission of the first radio signal.

The disclosure provides a first node for wireless communication, wherein the first node includes:

a first transceiver, to transmit a first sequence and a first radio signal, at least one of the first sequence or the first radio signal carrying a target identifier;

a first receiver, to monitor a first type of information in a first time window; and a first transmitter, when the first type of information is not detected in the first time window, to transmit a second sequence and a second radio signal.

Herein, a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV.

The disclosure provides a first node for wireless communication, wherein the first node includes:

a first transceiver, to transmit a first sequence and a first radio signal, at least one of the first sequence or the first radio signal carrying a target identifier;

a first receiver, to monitor a first type of information in a first time window; and a first transmitter, when the first type of information detected in the first time window includes only an identifier other than the target identifier, to transmit a second sequence and a second radio signal.

Herein, a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV.

The disclosure provides a second node for wireless communication, wherein the second node includes:

a second transceiver, to monitor a first sequence and a first radio signal, at least one of the first sequence or the first radio signal carrying a target identifier;

a second transmitter, to transmit a first type of information in a first time window, the first type of information only including an identifier other than the target identifier; and a second receiver, to monitor a second sequence and a second radio signal.

Herein, a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV.

The disclosure provides a second node for wireless communication, wherein the second node includes:

a second transceiver, to monitor a first sequence and a first radio signal, at least one of the first sequence or the first radio signal carrying a target identifier;

a second transmitter, to give up transmitting a first type of information in a first time window; and a second receiver, to monitor a second sequence and a second radio signal.

Herein, a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV.

In one embodiment, compared with conventional schemes, the disclosure has the following advantages.

The first sequence and the first radio signal constitute a MsgA, the second sequence and the second radio signal are a retransmission of the MsgA; through the second information, the first node can indicate the second node in the disclosure to combine the first radio signal and the second radio signal to obtain a combination gain, thereby improving the performance of reception of the data part in the MsgA.

The transmission of the preamble employs power ramping, thereby guaranteeing the orthogonality of the preamble and improving the performance of transmission. Meanwhile, the first radio signal and the second radio signal employ a same power, the receiving end improves the performance of transmission of the data part in the MsgA through a mode of combination gain, and interferences that are caused to other users by an unnecessary increase of power are avoided.

When the transmissions of the second radio signal and the first radio signal meet certain rules, and the certain rules need no explicit signaling to be indicated, for example, when the second radio signal includes only partial bits of the first bit block and there exists a third radio signal which is a third retransmission of the first radio signal, the above method enables the second node to adopt a proper combination method and a proper decoding method to receive multiple retransmissions of one MsgA.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
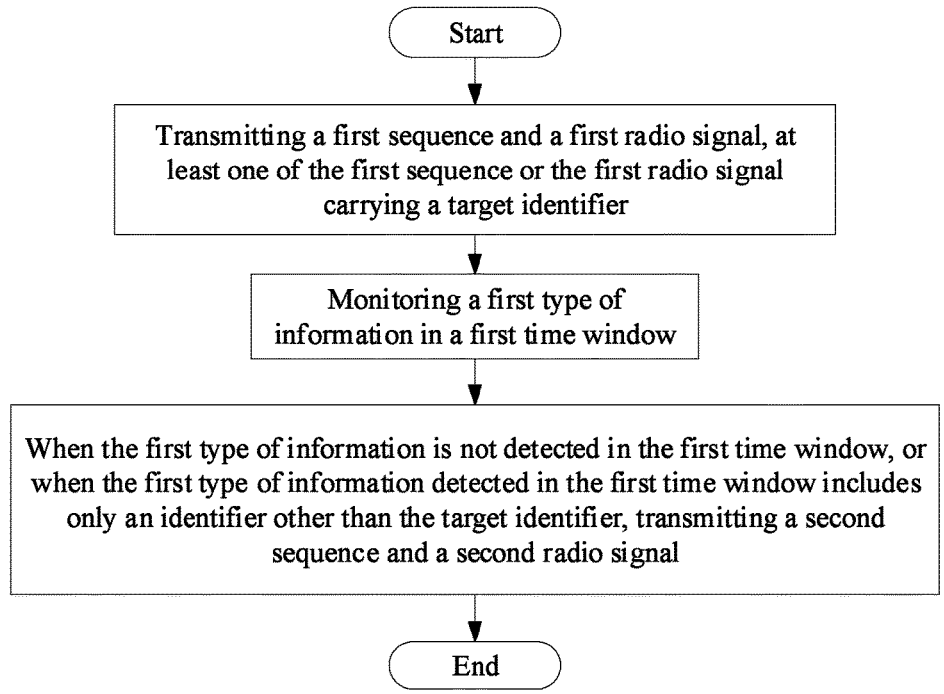
FIG. 1 is a flowchart of a first sequence and a first radio signal according to one embodiment of the disclosure.

Embodiment 1 is a flowchart of a first sequence and a first radio signal, as shown in FIG. 1.

In Embodiment 1, the first node in the disclosure first transmits a first sequence and a first radio signal, at least one of the first sequence or the first radio signal carrying a target identifier, then monitors a first type of information in a first time window, and when the first type of information is not detected in the first time window, or when the first type of information detected in the first time window includes only an identifier other than the target identifier, transmits a second sequence and a second radio signal; wherein a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV.

In one embodiment, the target identifier is used for identifying the first node, In one embodiment, the target identifier is related to an SAE Temporary Mobile Subscriber Identity (S-TMSI) of the first node, wherein SAE represents System Architecture Evolution.

In one embodiment, the target identifier is related to an International Mobile Subscriber Identification Number (IMSI) of the first node.

In one embodiment, the target identifier is a random number generated by the first node.

In one embodiment, the first sequence carries the target identifier.

In one subembodiment, the phrase that the first sequence carries the target identifier means: the target identifier is used for generating the first sequence.

In one embodiment, the first radio signal carries the target identifier.

In one embodiment, the phrase that the first radio signal carries the target identifier means: the first radio signal includes the target identifier.

In one embodiment, the phrase that the first radio signal carries the target identifier means: the first radio signal is scrambled with the target identifier.

In one embodiment, the first sequence and the second sequence are a same signature sequence.

In one subembodiment, the target identifier is used for generating the same signature sequence.

In one embodiment, the first sequence and the second sequence are different signature sequences respectively.

In one subembodiment, the target identifier is used for generating the first sequence, a second identifier is used for generating the second sequence, and the target identifier is different from the second identifier.

In one affiliated embodiment of the above subembodiment, the target identifier and the second identifier are two different random numbers generated by the first node.

In one affiliated embodiment of the above subembodiment, the target identifier and the second identifier are both related to an S-TMSI of the first node, or the target identifier and the second identifier are both related to an IMSI of the first node.

In one embodiment, the first sequence and the first radio signal are used for transmitting a Msg-A.

In one embodiment, the second sequence and the second radio signal are used for transmitting a Msg-A.

In one embodiment, all bits in the first bit block are used for generating the first radio signal, and partial bits in the first bit block are used for generating the second radio signal.

In one embodiment, the second sequence carries the target identifier.

In one subembodiment, the phrase that the second sequence carries the target identifier means: the target identifier is used for generating the second sequence.

In one embodiment, the second radio signal carries the target identifier.

In one subembodiment, the phrase that the second radio signal carries the target identifier means: the second radio signal includes the target identifier.

In one embodiment, a physical layer channel occupied by the first sequence includes a Physical Random Access Channel (PRACH).

In one embodiment, a physical layer channel occupied by the second sequence includes a PRACH.

In one embodiment, the first sequence occupies a first time-frequency resource set, the first radio signal occupies a second time-frequency resource set, a time-frequency position of the first time-frequency resource set is related to a time-frequency position of the second time-frequency resource set.

In one embodiment, the first sequence occupies a first time-frequency resource set, the first radio signal occupies a second time-frequency resource set, a time-frequency position of the first time-frequency resource set is used for determining a time-frequency position of the second time-frequency resource set.

In one embodiment, the first sequence occupies a first time-frequency resource set, the first radio signal occupies a second time-frequency resource set, and the first sequence is used for determining a time-frequency position of the second time-frequency resource set.

In one subembodiment of the above three embodiments, a time-frequency position of the first time-frequency resource set is configured through a higher-layer signaling.

In one subembodiment of the above three embodiments, a time-frequency position of the first time-frequency resource set is predefined.

In one embodiment, the second sequence occupies a third time-frequency resource set, the second radio signal occupies a fourth time-frequency resource set, a time-frequency position of the third time-frequency resource set is related to a time-frequency position of the fourth time-frequency resource set.

In one embodiment, the second sequence occupies a third time-frequency resource set, the second radio signal occupies a fourth time-frequency resource set, a time-frequency position of the third time-frequency resource set is used for determining a time-frequency position of the fourth time-frequency resource set.

In one embodiment, the second sequence occupies a third time-frequency resource set, the second radio signal occupies a fourth time-frequency resource set, and the second sequence is used for determining a time-frequency position of the fourth time-frequency resource set.

In one subembodiment of the above three embodiments, a time-frequency position of the third time-frequency resource set is configured through a higher-layer signaling.

In one subembodiment of the above three embodiments, a time-frequency position of the third time-frequency resource set is predefined.

In one embodiment, a physical layer channel occupied by the first radio signal includes a Physical Uplink Shared Channel (PUSCH).

In one embodiment, a physical layer channel occupied by the second radio signal includes a PUSCH.

In one embodiment, the first radio signal includes a Demodulation Reference Signal (DMRS).

In one embodiment, the second radio signal includes a DMRS.

In one embodiment, the second radio signal is a retransmission of the first radio signal.

In one embodiment, the first sequence and the second sequence both carry the target identifier, and the second sequence is a retransmission of the first sequence.

In one embodiment, the second radio signal includes Uplink Control Information (UCI), and the UCI includes configuration information of the first radio signal.

In one embodiment, the first bit block carries the second information.

In one embodiment, the second radio signal includes a UCI, and the UCI is used for carrying the second information.

In one embodiment, the second radio signal includes a PUSCH and a reference signal, and the reference signal is used for carrying the second information.

In one embodiment, the second radio signal includes a PUSCH, a reference signal and a UCI, and the UCI is used for carrying the second information.

In one embodiment, the first type of information is a feedback for the first sequence and the first radio signal.

In one embodiment, the first type of information is a Msg-B.

In one embodiment, a physical layer channel occupied by the first type of information includes a Physical Downlink Shared Channel (PDSCH).

In one embodiment, the first type of information includes a first type of physical layer information and a first type of higher layer information, a physical layer channel occupied by the first type of physical layer information is a first PDCCH, and a physical layer channel occupied by the first type of higher layer information is a first PDSCH.

In one subembodiment, the phrase that the first type of information is not detected in the first time window means: the first PDCCH is not detected by the first node.

In one affiliated embodiment of the above subembodiment, the phrase that the first PDCCH is not detected means: the first PDCCH includes a Cyclic Redundancy Check (CRC) sequence scrambled with a given Radio Network Temporary Identifier (RNTI), the first node performs a CRC sequence check through the given RNTI and the CRC sequence check is not successful.

In one affiliated embodiment of the above subembodiment, the phrase that the first PDCCH is not detected means: the first PDCCH includes a CRC sequence, and the first node, after receiving the first PDCCH, performs a modulo 2 division on a cyclic generation polynomial of the CRC sequence using the CRC sequence in the received PDCCH, and the remainder is not 0.

In one subembodiment, the phrase that the first type of information is not detected in the first time window means: the first PDSCH is not correctly decoded by the first node.

In one affiliated embodiment of the above subembodiment, the phrase that the first PDSCH is not detected means: the first PDSCH is not correctly decoded by the first node.

In one affiliated embodiment of the above subembodiment, the phrase that the first PDSCH is not detected means: the first PDSCH includes a CRC sequence, and the first node, after receiving the first PDSCH, fails to perform a CRC sequence check using the CRC sequence in the received first PDSCH.

In one embodiment, the phrase that the first type of information detected in the first time window includes only an identifier other than the target identifier means: the first type of information includes a first type of higher layer information, the first type of higher layer information includes K1 identifier(s) of a first type, the K1 is a positive integer, and any one of the K1 identifier(s) of the first type is not equal to the target identifier.

In one embodiment, the second node confirms to the first node through the first type of information whether the second node correctly detects the first sequence and correctly decodes the first radio signal.

In one embodiment, the second node confirms to the first node through the first type of information whether the second node responds to a random access request initiated by the first node.

In one embodiment, the first type of information includes a first type of physical layer information and a first type of higher layer information, at least one of the first type of physical layer information and the first type of higher layer information is used for determining K1 identifier(s) of a first type, the target identifier is one of the K1 identifier(s) of the first type, and the first node considers that the second node correctly detects the first sequence and correctly decodes the first radio signal.

In one embodiment, a duration of the first time window in time domain is fixed, or a duration of the first time window in time domain is configured through a higher layer signaling.

In one embodiment, the first time window occupies a positive integer number of consecutive slots.

In one embodiment, the first time window occupies a positive integer number of consecutive subframes.

In one embodiment, a start of the first time window is an end time to transmit the first radio signal, and an end of the first time window is a start time to transmit the second sequence.

In one embodiment, a start of the first time window is a summation of an end time to transmit the first radio signal and a first time offset, and an end of the first time window is a start time to transmit the second sequence; the first time offset is equal to T slot(s), the T is a positive integer and the T is fixed.

In one embodiment, the monitoring in the disclosure includes a blind detection.

In one embodiment, the monitoring in the disclosure includes receiving and demodulating.

In one embodiment, the monitoring in the disclosure includes receiving and decoding.

In one embodiment, the first sequence and the first radio signal are transmitted in a first time unit, the second sequence and the second radio signal are transmitted in a second time unit, and the first time unit is earlier than the second time unit in time domain.

Embodiment 2

Figure 2:
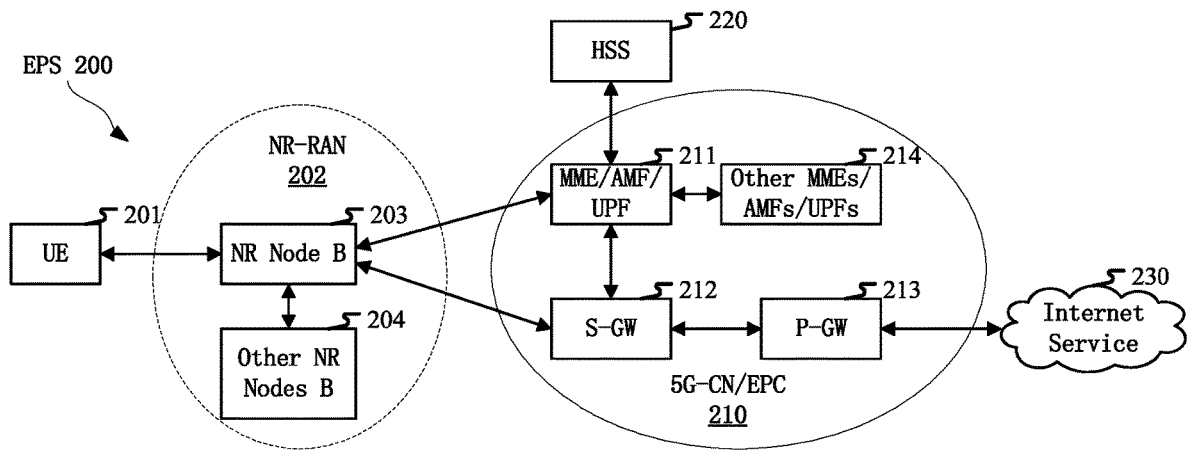
FIG. 2 is a diagram illustrating a network architecture according to one embodiment of the disclosure.

Embodiment 2 illustrates a diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the gNB 203 corresponds to the second node in the disclosure.

In one embodiment, an air interface between the UE 201 and the gNB 203 is a Uu interface.

In one embodiment, a wireless link between the UE 201 and the gNB 203 is a cellular link.

In one embodiment, the first node in the disclosure is the UE 201, and the second node in the disclosure is the gNB 203.

In one embodiment, the first node in the disclosure is the UE 201, and the second node in the disclosure is one terminal equipment other than the UE 201.

In one embodiment, the first node in the disclosure is the UE 201, the second node in the disclosure is one terminal equipment other than the UE 201, and an air interface between the UE 201 and the second node is a PC-5 interface.

Embodiment 3

Figure 3:
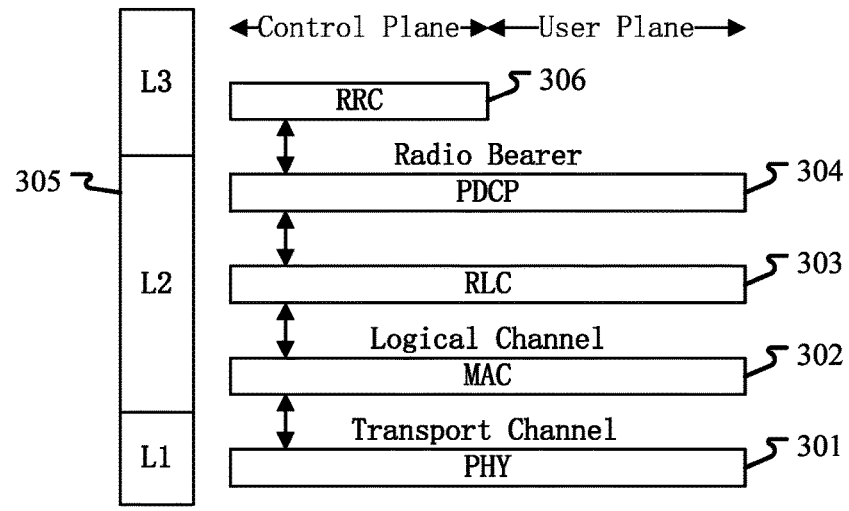
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a first node and a second node is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the links between the first node and the second node over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the second node on the network side. Although not shown in FIG. 3, the first node may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between the second nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the first node and the second node is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the second node and the first node.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the first sequence in the disclosure is generated on the PHY 301.

In one embodiment, the first radio signal in the disclosure is generated on the PHY 301.

In one embodiment, the first radio signal in the disclosure is generated on the MAC sublayer 302.

In one embodiment, the second sequence in the disclosure is generated on the PHY 301.

In one embodiment, the second radio signal in the disclosure is generated on the PHY 301.

In one embodiment, the second radio signal in the disclosure is generated on the MAC sublayer 302.

In one embodiment, the first type of information in the disclosure is generated on the PHY 301.

In one embodiment, the first type of information in the disclosure is generated on the MAC sublayer 302.

In one embodiment, the first signaling in the disclosure is generated on the RRC sublayer 306.

Embodiment 4

Figure 4:
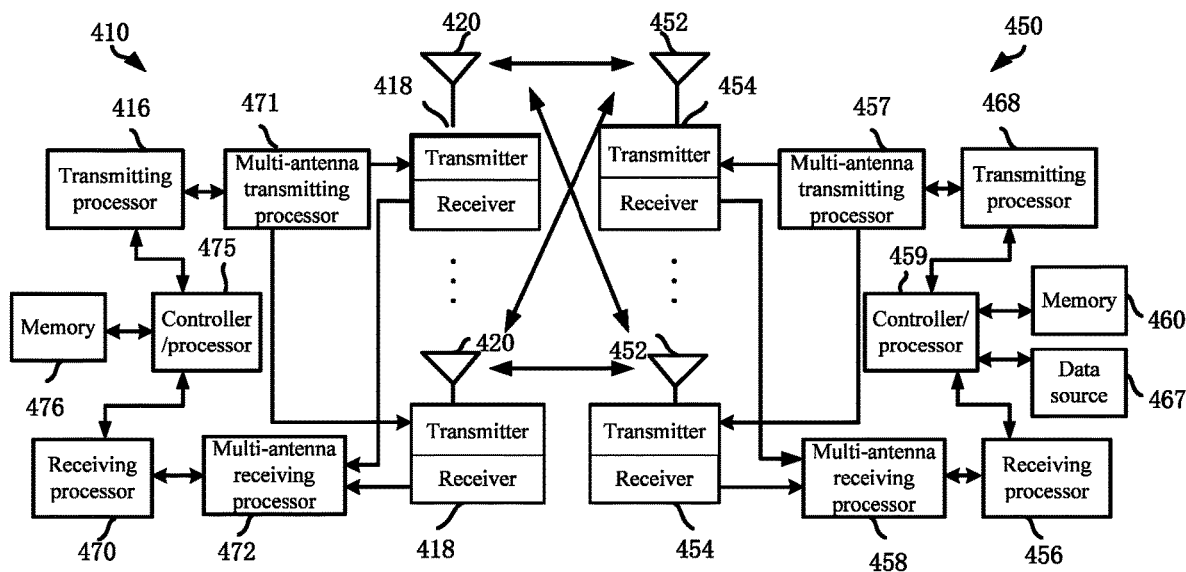
FIG. 4 is a diagram illustrating a first node and a second node according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the first communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor

459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least transmits a first sequence and a first radio signal, at least one of the first sequence or the first radio signal carrying a target identifier, monitors a first type of information in a first time window, and when the first type of information is not detected in the first time window, transmits a second sequence and a second radio signal; wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed MCS or an employed RV.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least transmits a first sequence and a first radio signal, at least one of the first sequence or the first radio signal carrying a target identifier, monitors a first type of information in a first time window, and when the first type of information detected in the first time window includes only an identifier other than the target identifier, transmits a second sequence and a second radio signal; wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed MCS or an employed RV.

In one embodiment, the first communication equipment 450 includes a memory that stores a computer readable instruction program. The computer readable instruction program generates an action when executed by at least one processor. The action includes: transmitting a first sequence and a first radio signal, at least one of the first sequence or the first radio signal carrying a target identifier, monitoring a first type of information in a first time window, and when the first type of information is not detected in the first time window, transmitting a second sequence and a second radio signal; wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed MCS or an employed RV.

In one embodiment, the first communication equipment 450 includes a memory that stores a computer readable instruction program. The computer readable instruction program generates an action when executed by at least one processor. The action includes: transmitting a first sequence and a first radio signal, at least one of the first sequence or the first radio signal carrying a target identifier, monitoring a first type of information in a first time window, and when the first type of information detected in the first time window includes only an identifier other than the target identifier, transmitting a second sequence and a second radio signal; wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed MCS or an employed RV.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least monitors a first sequence and a first radio signal, at least one of the first sequence or the first radio signal carrying a target identifier, transmits a first type of information in a first time window, the first type of information only including an identifier other than the target identifier, and monitors a second sequence and a second radio signal; wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed MCS or an employed RV.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least monitors a first sequence and a first radio signal, at least one of the first sequence or the first radio signal carrying a target identifier, gives up transmitting a first type of information in a first time window, and monitors a second sequence and a second radio signal; wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed MCS or an employed RV.

In one embodiment, the second communication equipment 410 includes a memory that stores a computer readable instruction program. The computer readable instruction program generates an action when executed by at least one processor. The action includes: monitoring a first sequence and a first radio signal, at least one of the first sequence or the first radio signal carrying a target identifier, transmitting a first type of information in a first time window, the first type of information only including an identifier other than the target identifier, and monitoring a second sequence and a second radio signal; wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed MCS or an employed RV.

In one embodiment, the second communication equipment 410 includes a memory that stores a computer readable instruction program. The computer readable instruction program generates an action when executed by at least one processor. The action includes: monitoring a first sequence and a first radio signal, at least one of the first sequence or the first radio signal carrying a target identifier, giving up transmitting a first type of information in a first time window, and monitoring a second sequence and a second radio signal; wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed MCS or an employed RV.

In one embodiment, the first communication equipment 450 corresponds to the first node in the disclosure.

In one embodiment, the second communication equipment 410 corresponds to the second node in the disclosure.

In one embodiment, the first communication equipment 450 is one UE.

In one embodiment, the second communication equipment 410 is one base station.

In one embodiment, at least one of the antenna 452, the transmitter 454, the multiantenna transmitting processor 457, the transmitting processor 468 or the controller/processor 459 is used for transmitting a first sequence and a first radio signal, at least one of the first sequence or the first radio signal carrying a target identifier; and at least one of the antenna 420, the receiver 418, the multiantenna receiving processor 472, the receiving processor 470 or the controller/processor 475 is used for monitoring a first sequence and a first radio signal, at least one of the first sequence or the first radio signal carrying a target identifier.

In one embodiment, at least one of the antenna 452, the receiver 454, the multiantenna receiving processor 458 or the receiving processor 456 is used for monitoring a first type of information in a first time window.

In one embodiment, at least one of the antenna 420, the transmitter 418, the multiantenna transmitting processor 471 or the transmitting processor 416 is used for transmitting a first type of information in a first time window, the first type of information only including an identifier other than the target identifier.

In one embodiment, at least one of the antenna 420, the transmitter 418, the multiantenna transmitting processor 471 or the transmitting processor 416 is used for giving up transmitting a first type of information in a first time window.

In one embodiment, when the first type of information is not detected in the first time window, at least one of the antenna 452, the transmitter 454, the multiantenna transmitting processor 457, the transmitting processor 468 or the controller/processor 459 is used for transmitting a second sequence and a second radio signal.

In one embodiment, when the first type of information detected in the first time window includes only an identifier other than the target identifier, at least one of the antenna 452, the transmitter 454, the multiantenna transmitting processor 457, the transmitting processor 468 or the controller/processor 459 is used for transmitting a second sequence and a second radio signal.

In one embodiment, at least one of the antenna 420, the receiver 418, the multiantenna receiving processor 472, the receiving processor 470 or the controller/processor 475 is used for monitoring a second sequence and a second radio signal.

In one embodiment, at least one of the antenna 452, the receiver 454, the multiantenna receiving processor 458 or the receiving processor 456 is used for receiving a first signaling; and at least one of the antenna 420, the transmitter 418, the multiantenna transmitting processor 471 or the transmitting processor 416 is used for transmitting a first signaling.

Embodiment 5

Figure 5:
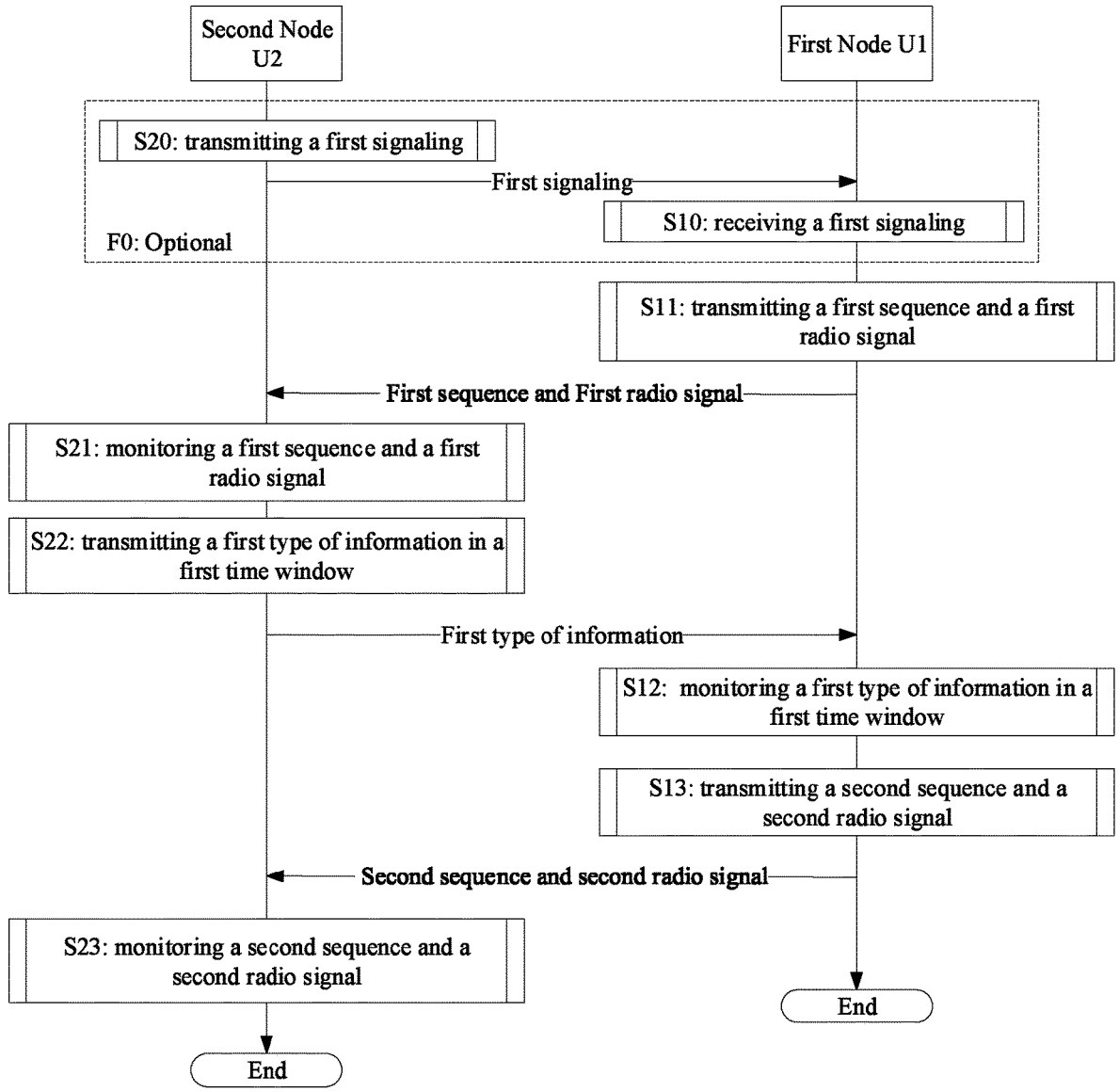
FIG. 5 is a flowchart of a second sequence and a second radio signal according to one embodiment of the disclosure.

Embodiment 5 illustrates a flowchart of a second sequence and a second radio signal, as shown in FIG. 5. In FIG. 5, a first node U1 and a second node U2 perform communication through an air interface. F0 is optional in FIG. 5.

The first node U1 receives a first signaling in S10, transmits a first sequence and a first radio signal in S11, monitors a first type of information in a first time window in S12, and transmits a second sequence and a second radio signal in S13.

The second node U2 transmits a first signaling in S20, monitors a first sequence and a first radio signal in S21, transmits a first type of information in a first time window in S22, and monitors a second sequence and a second radio signal in S23.

In Embodiment 5, at least one of the first sequence and the first radio signal carries a target identifier; the first type of information detected by the first node U1 in the first time window includes only an identifier other than the target identifier; a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV; the first signaling is used for determining K1 candidate sequence(s), and the K1 is a positive integer; the first sequence is one of the K1 candidate sequence(s), and the second sequence is one of the K1 candidate sequence(s); the first node U1 autonomously selects the first sequence from the K1 candidate sequence(s), and the first node U1 autonomously selects the second sequence from the K1 candidate sequence(s).

In one embodiment, the first signaling is a physical signaling.

In one embodiment, the first signaling is a higher layer signaling.

In one embodiment, the first signaling is an RRC signaling.

In one embodiment, the first sequence is transmitted employing a first power value, the second sequence is transmitted employing a second power value, and the second power value is greater than the first power value; a difference between the second power value and the first power value is fixed, or a difference between the second power value and the first power value is configured through a higher layer signaling.

In one subembodiment, neither the first power value nor the second power value is greater than a first threshold.

In one affiliated embodiment of the above subembodiment, the first threshold is $P_{PRACH,f,c}(i)$ in TS 38.213.

In one subembodiment, the first power value is in unit of dBm, or the first power value is in unit of mW.

In one subembodiment, the second power value is in unit of dBm, or the second power value is in unit of mW.

In one subembodiment, a difference of the second power value minus the first power value is equal to a first offset, and the first offset is in unit of dB.

In one affiliated embodiment of the above subembodiment, the first offset is equal to powerRampingStep in TS 38.331.

In one affiliated embodiment of the above subembodiment, the first offset is configured through a RACH-ConfigGeneric IE in TS 38.331.

In one embodiment, the first radio signal and the second radio signal employ a same transmit power.

In one subembodiment, the first radio signal and the second radio signal are both transmitted employing a same transmit power as the first sequence.

In one subembodiment, the first radio signal and the second radio signal are both transmitted employing the first power value in the disclosure.

In one embodiment, the first radio signal and the second radio signal occupy a same number of REs.

In one embodiment, the first sequence and the second sequence occupy a same number of REs.

In one embodiment, all bits in the first bit block are used for generating the first radio signal, and partial bits in the first bit block are used for generating the second radio signal.

In one embodiment, the first radio signal employs a first MCS, the second radio signal employs a second MCS, a number of modulated symbols formed by the first bit block according to the first MCS is greater than a number of modulated symbols formed by the first bit block according to the second MCS; the first radio signal and the second radio signal both occupy M RE(s), and the M is a positive integer; an RE among the M RE(s) occupied by the second radio signal that is not occupied by the modulated symbols generated by the first bit block is used for transmitting the second information.

In one embodiment, the second sequence is used for determining that the second radio signal is a second transmission of the first radio signal.

In one subembodiment, the second sequence is used for indicating that the second radio signal is a second transmission of the first radio signal.

In one affiliated embodiment of the above subembodiment, the first node totally supports Q1 transmissions of the first radio signal, a first transmission among the Q1 transmissions is indicated through the first sequence, a second transmission among the Q1 transmissions is indicated through the second sequence, an ith transmission among the Q1 transmission is indicated through an ith sequence, the i is a positive integer greater than 1 but not greater than Q1; any two signature sequences among the first sequence, the second sequence and the ith sequence are orthogonal, and the order in which the first node selects the first sequence to the tenth sequence is fixed.

In one embodiment, the second radio signal includes a target reference signal, and the target reference signal is used for determining that the second radio signal is a second transmission of the first radio signal.

In one subembodiment, a scrambling code of the target reference signal is used for indicating that the second radio signal is a second transmission of the first radio signal.

In one subembodiment, a signature sequence generating the target reference signal is used for indicating that the second radio signal is a second transmission of the first radio signal.

In one subembodiment, the first node totally supports Q1 transmissions of the first radio signal, the former two transmissions among the Q1 transmissions correspond to the first radio signal and the second radio signal respectively, an ith transmission among the Q1 transmissions corresponds to an ith radio signal; the first radio signal includes a first reference signal, the second radio signal includes a target reference signal, the ith radio signal includes an ith reference signal; the i is a positive integer greater than 1 not greater than Q1; scrambling codes for any two of the first reference signal, the target reference signal and the ith reference signal are orthogonal; or, generation sequences for any two of the first reference signal, the target reference signal and the ith reference signal are orthogonal.

In one embodiment, the second information is used for indicating that the second radio signal is a second transmission of the first radio signal.

In one embodiment, the second node U2 monitors the first sequence and the first radio signal and does not correctly detect the first sequence, and the second node U2 detects a sequence other than the first sequence in time-frequency resources occupied by the first sequence, then the second node U2 transmits the first type of information, and the first type of information includes only an identifier other than the target identifier, wherein the identifier other than the target identifier corresponds to the sequence other than the first sequence.

In one subembodiment, the phrase that the second node does not correctly detect the first sequence refers that: the first sequence is generated by a first signature sequence, and the second node does not determine the first signature sequence based on a coherent detection.

In one embodiment, the second node U2 monitors the first sequence and the first radio signal and does not correctly detect the first radio signal, and the second node U2 detects a radio signal other than the first radio signal in time-frequency resources occupied by the first radio signal, the radio signal other than the first radio signal includes an identifier other than the target identifier; then the second node U2 transmits the first type of information, and the first type of information includes only the identifier other than the target identifier.

In one subembodiment, the phrase that the second node does not correctly detect the first radio signal refers that: the first radio signal includes a CRC sequence, and the second node U2 determines that the first radio signal is not correctly decoded based on a detection of the CRC sequence.

In one subembodiment, the phrase that the second node does not correctly detect the first radio signal refers that: the first radio signal includes a CRC sequence; the first node, after receiving the first radio signal, performs a modulo 2 division on a cyclic generation polynomial of the CRC sequence using the CRC sequence in the received radio signal, and the remainder is not 0, then the second node U2 considers that the first radio signal is not correctly decoded.

Embodiment 6

Figure 6:
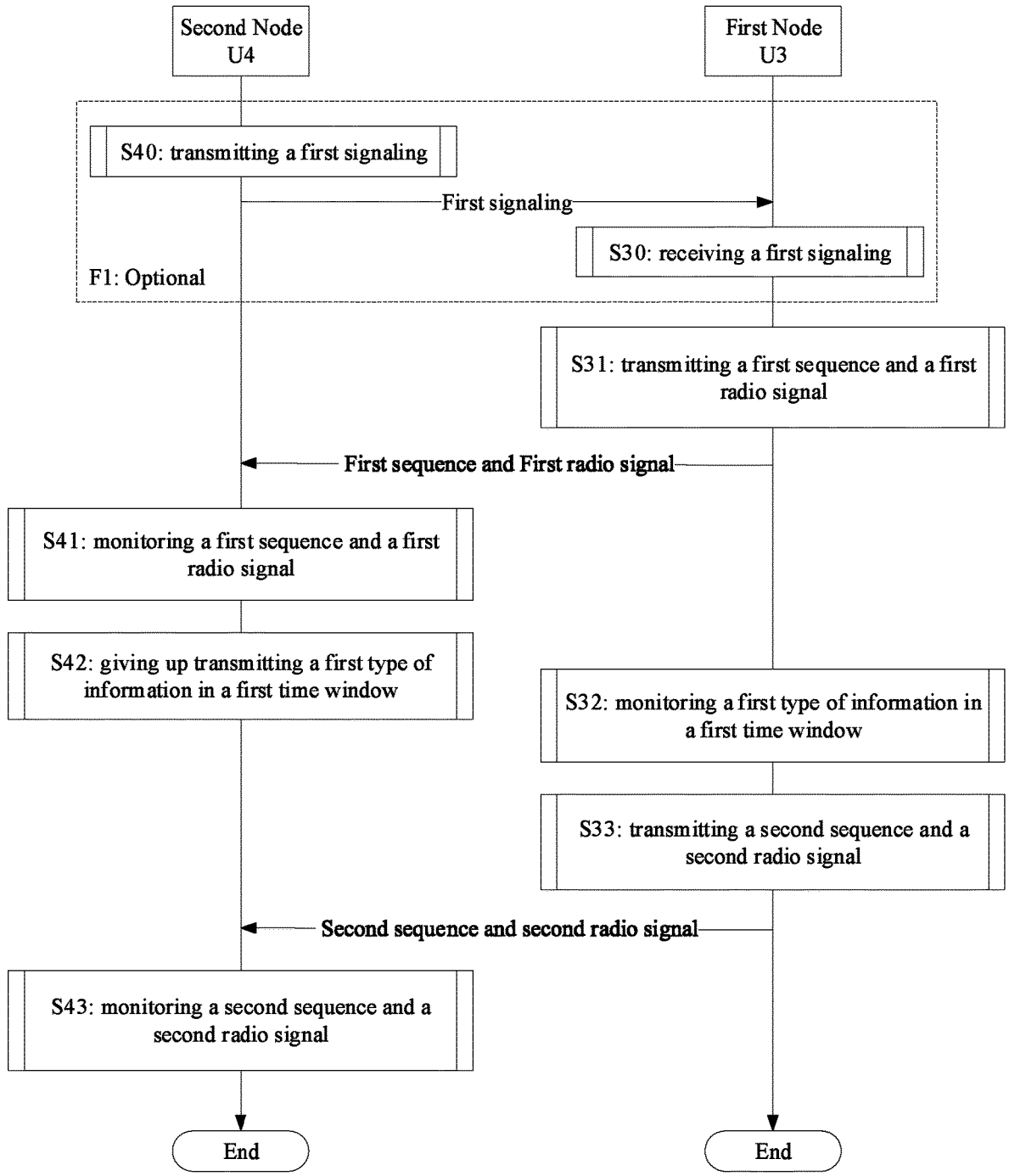
FIG. 6 is a flowchart of a second sequence and a second radio signal according to one embodiment of the disclosure.

Embodiment 6 illustrates a flowchart of a second sequence and a second radio signal, as shown in FIG. 6. In FIG. 6, a first node U3 and a second node U4 perform communication through an air interface. F1 is optional in FIG. 6. Embodiments, subembodiments and affiliated embodiments in Embodiment 5 are applicable to Embodiment 6 if no conflict is incurred.

The first node U3 receives a first signaling in S30, transmits a first sequence and a first radio signal in S31, monitors a first type of information in a first time window in S32, and transmits a second sequence and a second radio signal in S33.

The second node U4 transmits a first signaling in S40, monitors a first sequence and a first radio signal in S41, gives up transmitting a first type of information in a first time window in S42, and monitors a second sequence and a second radio signal in S43.

In Embodiment 6, at least one of the first sequence and the first radio signal carries a target identifier; the first node U3 does not detect the first type of information in the first time window; a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV; the first signaling is used for determining K1 candidate sequence(s), and the K1 is a positive integer; the first sequence is one of the K1 candidate sequence(s), and the second sequence is one of the K1 candidate sequence(s); the first node U3 autonomously selects the first sequence from the K1 candidate sequence(s), and the first node U3 autonomously selects the second sequence from the K1 candidate sequence(s).

In one embodiment, the second node U4 monitors the first sequence and the first radio signal, and does not correctly detect the first sequence, then the second node U4 gives up transmitting the first type of information.

In one subembodiment, the second node U4 does not detect the first sequence or an sequence other than the first sequence in time-frequency resources occupied by the first sequence.

In one embodiment, the second node U4 monitors the first sequence and the first radio signal, and does not correctly detect the first radio signal, then the second node U4 gives up transmitting the first type of information.

In one subembodiment, the second node U4 does not detect the first radio signal or a radio signal carrying an identifier other than the target identifier in time-frequency resources occupied by the first radio signal.

Embodiment 7

Figure 7:
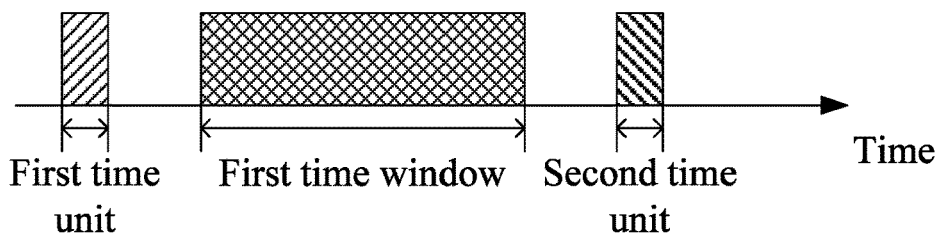
FIG. 7 is a diagram illustrating a first time window according to one embodiment of the disclosure.

Embodiment 7 illustrates a diagram of a first time window, as shown in FIG. 7. In FIG. 7, the first node transmits the first sequence and the first radio signal in a first time unit shown in FIG. 7, and then the first node monitors a first type of information in the first time window shown in FIG. 7; if the first type of information is not detected in the first time window, or the first type of information detected in the first time window includes only an identifier other than the target identifier, the first node transmits a second sequence and a second radio signal in a second time unit shown in FIG. 7.

In one embodiment, the first time window occupies a positive integer number of consecutive slots.

In one embodiment, the first time unit occupies one slot.

In one embodiment, the second time unit occupies one slot.

In one embodiment, a duration of the first time window in time domain is fixed, or a duration of the first time window in time domain is configured through a higher layer signaling.

In one embodiment, a time difference between an end of the first time unit and a start of the first time window is fixed.

In one embodiment, a time difference between an end of the first time unit and a start of the first time window is related to a subcarrier spacing employed by the first radio signal.

In one embodiment, a time difference between an end of the first time unit and a start of the first time window is configured through a higher layer signaling.

In one embodiment, a time difference between an end of the first time window and a start of the second time unit is fixed.

In one embodiment, a time difference between an end of the first time window and a start of the second time unit is related to a subcarrier spacing employed by the first radio signal.

In one embodiment, a time difference between an end of the first time window and a start of the second time unit is configured through a higher layer signaling.

Embodiment 8

Figure 8:
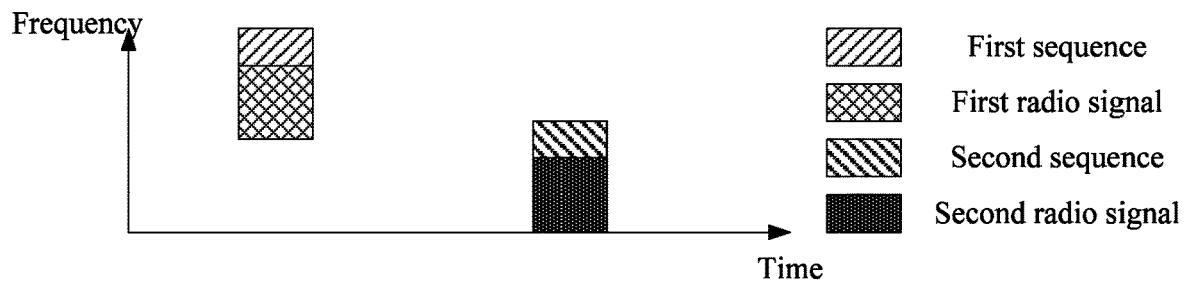
FIG. 8 is a diagram illustrating a first sequence, a first radio signal, a second sequence and a second radio signal according to one embodiment of the disclosure.

Embodiment 8 illustrates a diagram of a first sequence, a first radio signal, a second sequence and a second radio signal, as shown in FIG. 8. In FIG. 8, the first sequence and the first radio signal are Frequency Domain Multiplex (FDM), the second sequence and the second radio signal are FDM.

In one embodiment, the first sequence is used for indicating positions of frequency domain resources occupied by the first radio signal.

In one embodiment, the second sequence is used for indicating positions of frequency domain resources occupied by the second radio signal.

In one embodiment, positions of frequency domain resources occupied by the first sequence are one-to-one corresponding to positions of frequency domain resources occupied by the first radio signal.

In one embodiment, positions of frequency domain resources occupied by the second sequence are one-to-one corresponding to positions of frequency domain resources occupied by the second radio signal.

In one embodiment, frequency domain resources occupied by the first sequence and frequency domain resources occupied by the first radio signal are consecutive in frequency domain.

In one embodiment, frequency domain resources occupied by the second sequence and frequency domain resources occupied by the second radio signal are consecutive in frequency domain.

Embodiment 9

Figure 9:
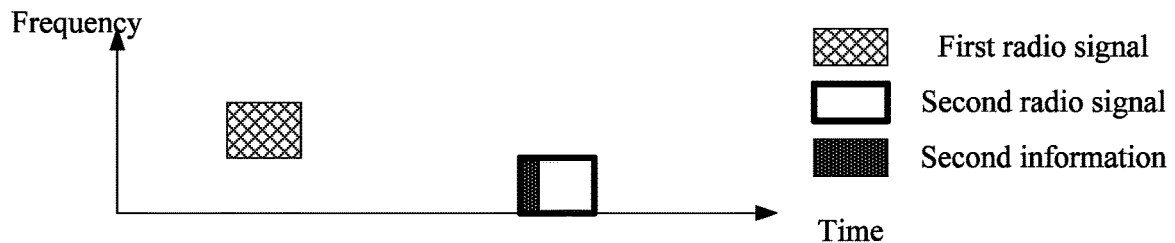
FIG. 9 is a diagram illustrating a first radio signal and a second radio signal according to one embodiment of the disclosure.

Embodiment 9 illustrates a diagram of a first radio signal and a second radio signal, as shown in FIG. 9. In FIG. 9, the first radio signal and the second radio signal occupy a same number of REs, the second radio signal includes second information, and the second information is used for determining that the second radio signal is a second transmission of the first radio signal.

In one embodiment, all bits in the first bit block in the disclosure are used for generating the first radio signal, and partial bits in the first bit block in the disclosure are used for generating the second radio signal.

In one embodiment, the first bit block in the disclosure is used for generating M1 bit subblocks, the M1 bit subblocks are all used for generating the first radio signal, and M2 bit subblock(s) among the M1 bit subblocks is(are) used for generating the second radio signal; the M1 is a positive integer greater than 1, and the M2 is a positive integer less than the M1.

In one subembodiment of the above embodiments, an RE among the REs occupied by the second radio signal that is not occupied by the modulated symbols generated by the first bit block is used for transmitting the second information.

Embodiment 10

Figure 10:
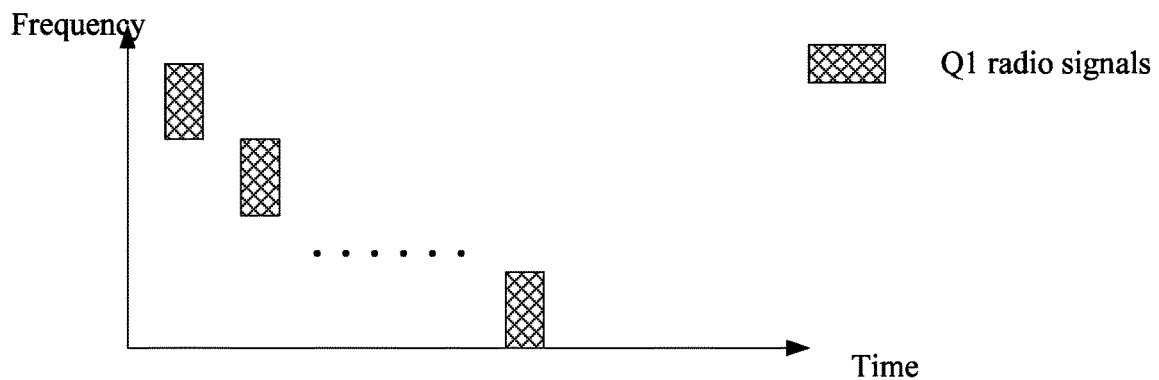
FIG. 10 is a diagram illustrating Q1 radio signals according to one embodiment of the disclosure.

Embodiment 10 illustrates a diagram of Q1 radio signals, as shown in FIG. 10. In FIG. 10, all the Q1 radio signals are transmissions of the first radio signal in the disclosure, a first radio signal among the Q1 radio signals is the first radio signal in the disclosure, and a second radio signal among the Q1 radio signals is the second radio signal in the disclosure; the Q1 radio signals are a radio signal #1 to a radio signal #Q1 respectively according to a time sequence; and the Q1 is a positive integer greater than 1.

In one embodiment, the Q1 radio signals include Q1 reference signals respectively; the Q1 reference signals are a reference signal #1 to a reference signal #Q1 respectively; a given reference signal is a reference signal #i among the Q1 reference signals, the i is a positive integer greater than 0 but not greater than the Q1, the given reference signal is used for indicating the i; the i is used for indicating that the radio signal #i including the given reference signal is the ith radio signal among the Q1 radio signals.

In one embodiment, transmit powers of the Q1 radio signals keep unchanged.

In one embodiment, the Q1 radio signals correspond to Q1 signature sequences respectively, a first signature sequence among the Q1 signature sequences is the first sequence in the disclosure, a second signature sequence among the Q1 signature sequences is the second sequence in the disclosure, and transmit powers of the Q1 signature sequences increase successively according to a time-domain sequence.

In one embodiment, the Q1 radio signals correspond to Q1 signature sequences respectively, a first signature sequence among the Q1 signature sequences is the first sequence in the disclosure, a second signature sequence among the Q1 signature sequences is the second sequence in the disclosure, and transmit powers of the Q1 signature sequences increase successively according to a time-domain sequence.

In one embodiment, the Q1 radio signals correspond to Q1 signature sequences respectively, a first signature sequence among the Q1 signature sequences is the first sequence in the disclosure, a second signature sequence among the Q1 signature sequences is the second sequence in the disclosure, a transmit power of an ith signature sequence among the Q1 signature sequences is equal to $P+R*(i-1)$, the unit of the P is dBm, the unit of the R is dB; the P is related to a pathloss between the first node and the second node, and the R is fixed or is configured through a higher layer signaling.

In one embodiment, the Q1 is fixed, or the Q1 is configured through a higher layer signaling.

Embodiment 11

Figure 11:
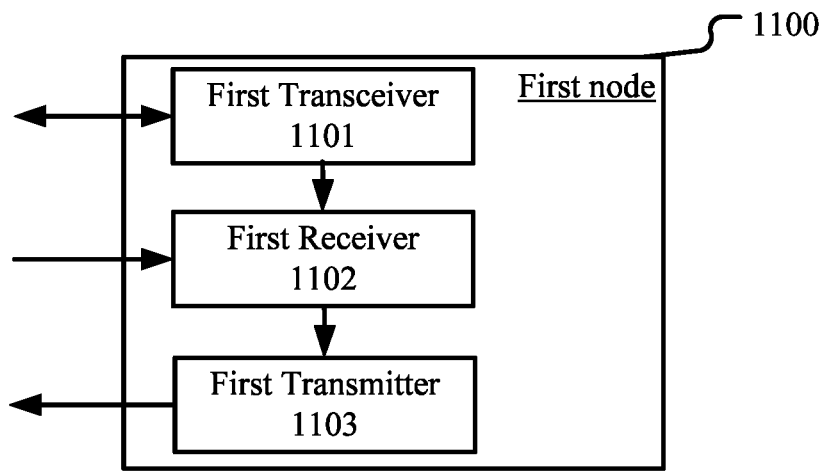
FIG. 11 is a structure block diagram illustrating a processing device in a first node according to one embodiment of the disclosure.

Embodiment 11 illustrates a structure block diagram of a processing device in a first node, as shown in FIG. 11. In FIG. 11, the processing device in the first node 1100 includes a first transceiver 1101, a first receiver 1102 and a first transmitter 1103.

The first transceiver 1101 transmits a first sequence and a first radio signal, at least one of the first sequence or the first radio signal carrying a target identifier.

The first receiver 1102 monitors a first type of information in a first time window.

The first transmitter 1103, when the first type of information is not detected in the first time window or when the first type of information detected in the first time window includes only an identifier other than the target identifier, transmits a second sequence and a second radio signal.

In Embodiment 11, a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV.

In one embodiment, the first transceiver 1101 receives a first signaling; the first signaling is used for determining K1 candidate sequence(s), and the K1 is a positive integer; the first sequence is one of the K1 candidate sequence(s), and the second sequence is one of the K1 candidate sequence(s); the first node autonomously selects the first sequence from the K1 candidate sequence(s), and the first node autonomously selects the second sequence from the K1 candidate sequence(s).

In one embodiment, the first sequence is transmitted employing a first power value, the second sequence is transmitted employing a second power value, and the second power value is greater than the first power value; a difference between the second power value and the first power value is fixed, or a difference between the second power value and the first power value is configured through a higher layer signaling.

In one embodiment, the first radio signal and the second radio signal employ a same transmit power.

In one embodiment, the first radio signal and the second radio signal occupy a same number of REs.

In one embodiment, the second sequence is used for determining that the second radio signal is a second transmission of the first radio signal; or the second radio signal includes a target reference signal, and the target reference signal is used for determining that the second radio signal is a second transmission of the first radio signal.

In one embodiment, the first transceiver 1101 includes at least the former six of the antenna 452, the receiver/transmitter 454, the multiantenna receiving processor 458, the receiving processor 456, the transmitting processor 468, the multiantenna transmitting processor 457 or the controller/processor 459 illustrated in Embodiment 4.

In one embodiment, the first receiver 1102 includes at least the former four of the antenna 452, the receiver 454, the multiantenna receiving processor 458, the receiving processor 456 or the controller/processor 459 illustrated in Embodiment 4.

In one embodiment, the first transmitter 1103 includes at least the former four of the antenna 452, the transmitter 454, the multiantenna transmitting processor 457, the transmitting processor 458 or the controller/processor 459 illustrated in Embodiment 4.

Embodiment 12

Figure 12:
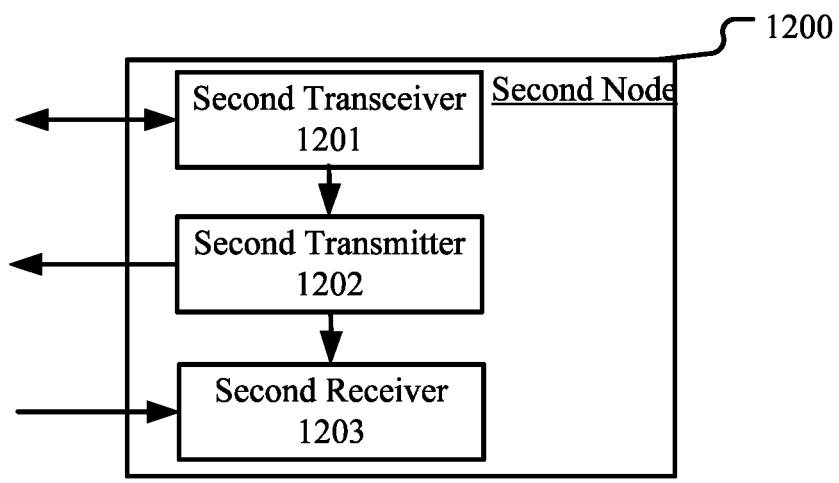
FIG. 12 is a structure block diagram illustrating a processing device in a second node according to one embodiment of the disclosure.

Embodiment 12 illustrates a structure block diagram of a processing device in a second node, as shown in FIG. 12. In FIG. 12, the processing device in the second node 1200 includes a second transceiver 1201, a second transmitter 1202 and a second receiver 1203.

The second transceiver 1201 monitors a first sequence and a first radio signal, at least one of the first sequence or the first radio signal carrying a target identifier.

The second transmitter 1202 transmits a first type of information in a first time window, the first type of information only including an identifier other than the target identifier; or gives up transmitting a first type of information in a first time window.

The second receiver 1203 monitors a second sequence and a second radio signal.

In Embodiment 12, a first bit block is used for generating the first radio signal, the first bit block includes a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information includes at least one of occupied time-frequency resources, an employed MCS or an employed RV.

In one embodiment, the second transceiver 1201 transmits a first signaling; the first signaling is used for determining K1 candidate sequence(s), and the K1 is a positive integer; the first sequence is one of the K1 candidate sequence(s), and the second sequence is one of the K1 candidate sequence(s); the first node autonomously selects the first sequence from the K1 candidate sequence(s), and the first node autonomously selects the second sequence from the K1 candidate sequence(s).

In one embodiment, the first sequence is transmitted employing a first power value, the second sequence is transmitted employing a second power value, and the second power value is greater than the first power value; a difference between the second power value and the first power value is fixed, or a difference between the second power value and the first power value is configured through a higher layer signaling.

In one embodiment, the first radio signal and the second radio signal employ a same transmit power.

In one embodiment, the first radio signal and the second radio signal occupy a same number of REs.

In one embodiment, the second sequence is used for determining that the second radio signal is a second transmission of the first radio signal; or the second radio signal includes a target reference signal, and the target reference signal is used for determining that the second radio signal is a second transmission of the first radio signal.

In one embodiment, the second transceiver 1201 includes at least the former six of the antenna 420, the transmitter/receiver 418, the multiantenna transmitting processor 471, the transmitting processor 416, the multiantenna receiving processor 472, the receiving processor 470 or the controller/processor 475 illustrated in Embodiment 4.

In one embodiment, the second transmitter includes at least the former four of the antenna 420, the transmitter 418, the multiantenna transmitting processor 471, the transmitting processor 416 or the controller/processor 475 illustrated in Embodiment 4.

In one embodiment, the second receiver 1203 includes at least the former four of the antenna 420, the receiver 418, the multiantenna receiving processor 472, the receiving processor 470 or the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node and the second node in the disclosure include but not limited to mobile phones, tablet computers, laptops, network cards, low-power equipment, eMTC terminals, NB-IOT terminals, vehicle-mounted communication equipment, transport tools, vehicles, RSUs, aircrafts, airplanes, unmanned aerial vehicles, telecontrolled aircrafts, and other radio communication equipment. The base station in the disclosure includes but not limited to macro-cellular base stations, micro-cellular base stations, home base stations, relay base stations, eNBs, gNBs, TRPs, GNSSs, relay satellites, satellite base stations, air base stations, RSUs and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for wireless communication, comprising:
   transmitting a first sequence and a first radio signal, at least one of the first sequence or the first radio signal carrying a target identifier;
   monitoring a first type of information in a first time window; and
   when the first type of information is not detected in the first time window, or when the first type of information detected in the first time window comprises only an identifier other than the target identifier, transmitting a second sequence and a second radio signal;
   wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed Modulation and Coding Scheme (MCS) or an employed Redundancy Version (RV); the second radio signal comprises a PUSCH, a reference signal and a UCI, and the UCI is used for carrying the second information.

2. A first node for wireless communication, comprising:
   a first transceiver, to transmit a first sequence and a first radio signal, at least one of the first sequence or the first radio signal carrying a target identifier;
   a first receiver, to monitor a first type of information in a first time window; and
   a first transmitter, when the first type of information is not detected in the first time window, or when the first type of information detected in the first time window comprises only an identifier other than the target identifier, to transmit a second sequence and a second radio signal;
   wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed Modulation and Coding Scheme (MCS) or an employed Redundancy Version (RV); the second radio signal comprises a PUSCH, a reference signal and a UCI, and the UCI is used for carrying the second information.

3. The first node according to claim 2, wherein the first transceiver receives a first signaling; the first signaling is used for determining K1 candidate sequence(s), and the K1 is a positive integer; the first sequence is one of the K1 candidate sequence(s), and the second sequence is one of the K1 candidate sequence(s); the first node autonomously selects the first sequence from the K1 candidate sequence(s), and the first node autonomously selects the second sequence from the K1 candidate sequence(s).

4. The first node according to claim 2, wherein the first sequence is transmitted employing a first power value, the second sequence is transmitted employing a second power value, and the second power value is greater than the first power value; a difference between the second power value and the first power value is fixed, or a difference between the second power value and the first power value is configured through a higher layer signaling.

5. The first node according to claim 2, wherein the first radio signal and the second radio signal employ a same transmit power.

6. The first node according to claim 2, wherein the first radio signal and the second radio signal occupy a same number of Resource Elements (REs).

7. The first node according to claim 2, wherein the second sequence is used for determining that the second radio signal is a second transmission of the first radio signal; or the second radio signal comprises a target reference signal, and the target reference signal is used for determining that the second radio signal is a second transmission of the first radio signal.

8. The first node according to claim 2, wherein the second radio signal comprises a PUSCH and a reference signal, and the reference signal is used for carrying the second information.

9. The first node according to claim 2, wherein all bits in the first bit block are used for generating the first radio signal, and partial bits in the first bit block are used for generating the second radio signal.

10. The first node according to claim 2, wherein the first radio signal employs a first MCS, the second radio signal employs a second MCS, a number of modulated symbols formed by the first bit block according to the first MCS is greater than a number of modulated symbols formed by the first bit block according to the second MCS; the first radio signal and the second radio signal both occupy M RE(s), and the M is a positive integer; an RE among the M RE(s) occupied by the second radio signal that is not occupied by the modulated symbols generated by the first bit block is used for transmitting the second information.

11. A second node for wireless communication, comprising:
- a second transceiver, to monitor a first sequence and a first radio signal, at least one of the first sequence or the first radio signal carrying a target identifier;
- a second transmitter, to transmit a first type of information in a first time window, the first type of information only comprising an identifier other than the target identifier; or to give up transmitting a first type of information in a first time window; and
- a second receiver, to monitor a second sequence and a second radio signal;
- wherein a first bit block is used for generating the first radio signal, the first bit block comprises a positive integer number of bits; the first bit block is also used for generating the second radio signal, and the second radio signal carries second information; at least one of the second sequence or the second radio signal carries the target identifier; the second information is used for determining configuration information of the first radio signal, and the configuration information comprises at least one of occupied time-frequency resources, an employed Modulation and Coding Scheme (MCS) or an employed Redundancy Version (RV); the second radio signal comprises a PUSCH, a reference signal and a UCI, and the UCI is used for carrying the second information.

12. The second node according to claim 11, wherein the first sequence is transmitted employing a first power value, the second sequence is transmitted employing a second power value, and the second power value is greater than the first power value; a difference between the second power value and the first power value is fixed, or a difference between the second power value and the first power value is configured through a higher layer signaling.

13. The second node according to claim 11, wherein the second transmitter transmits a first signaling; the first signaling is used for determining K1 candidate sequence(s), and the K1 is a positive integer; the first sequence is one of the K1 candidate sequence(s), and the second sequence is one of the K1 candidate sequence(s); the first node autonomously selects the first sequence from the K1 candidate sequence(s), and the first node autonomously selects the second sequence from the K1 candidate sequence(s).

14. The second node according to claim 11, wherein the first radio signal and the second radio signal employ a same transmit power.

15. The second node according to claim 11, wherein the first radio signal and the second radio signal occupy a same number of Resource Elements (REs).

16. The second node according to claim 11, wherein the second sequence is used for determining that the second radio signal is a second transmission of the first radio signal; or the second radio signal comprises a target reference signal, and the target reference signal is used for determining that the second radio signal is a second transmission of the first radio signal.

17. The second node according to claim 11, wherein all bits in the first bit block are used for generating the first radio signal, and partial bits in the first bit block are used for generating the second radio signal.

18. The second node according to claim 11, wherein the first radio signal employs a first MCS, the second radio signal employs a second MCS, a number of modulated symbols formed by the first bit block according to the first MCS is greater than a number of modulated symbols formed by the first bit block according to the second MCS; the first radio signal and the second radio signal both occupy M RE(s), and the M is a positive integer; an RE among the M RE(s) occupied by the second radio signal that is not occupied by the modulated symbols generated by the first bit block is used for transmitting the second information.

* * * * *